(12) United States Patent
Chien et al.

(10) Patent No.: US 7,660,699 B2
(45) Date of Patent: Feb. 9, 2010

(54) KNOWLEDGE-BASED STATISTICAL METHOD AND SYSTEM TO DETERMINE RELIABILITY COMPATIBILITY FOR SEMICONDUCTOR INTEGRATED CIRCUITS

(75) Inventors: Wei-Ting Kary Chien, Shanghai (CN); Siyuan Yang, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 735 days.

(21) Appl. No.: 11/200,497

(22) Filed: Aug. 8, 2005

(65) Prior Publication Data
US 2007/0032973 A1    Feb. 8, 2007

(30) Foreign Application Priority Data
Aug. 5, 2005    (CN) .................... 2005 1 0028650

(51) Int. Cl.
*G06F 17/18* (2006.01)
(52) U.S. Cl. ........................................ 702/181
(58) Field of Classification Search ............ 702/179, 702/181
See application file for complete search history.

(56) References Cited

U.S. PATENT DOCUMENTS

| 6,611,029 | B1 | 8/2003 | Ahmed et al. | |
|---|---|---|---|---|
| 6,657,252 | B2 | 12/2003 | Fried et al. | |
| 6,789,031 | B2 * | 9/2004 | Wang | 702/81 |
| 7,136,776 | B2 * | 11/2006 | Eichblatt et al. | 702/181 |

OTHER PUBLICATIONS

Bain et al., Statistical Analysis of Reliability and Life-Testing Models: Theory and Methods, Marcel Dekker, Inc., 1991, pp. 42-89.
Kececioglu, Reliability and Life Testing Handbook, vol. 1, PTR Prentice Hall, 1993, pp. 525-565.
Nelson, Accelerated Testing: Statistical Models, Test Plans, and Data Analyses, John Wiley & Sons, 1990, pp. 425-450.

* cited by examiner

*Primary Examiner*—Drew A Dunn
*Assistant Examiner*—Stephen J Cherry
(74) *Attorney, Agent, or Firm*—Townsend and Townsend and Crew LLP

(57) ABSTRACT

A method for determining whether a first group of a product, a component or a system in reliability life testing has longer lifetime than a second group. This method is non-parametric and free from a pre-assumption of statistical distributions and can be applied to all kinds of data and distributions. Errors from goodness-of-fit of distribution fitting and parameter estimations are thus eliminated. After pre-check on bimodal, early failures, and the failure mechanisms, the method employs numerical solutions with good accuracy by the non-parametric approach. The data under consideration can be censored, interval or bimodal, and not limited to simple cases of complete type. The method can be used to determine multiplicities of reliability tests for all product types and at all levels. Based on a comparability index derived from integrating the weighted difference between the reliability functions of the two groups under comparison. Several indices are proposed for effectiveness of reliability comparability.

20 Claims, 10 Drawing Sheets

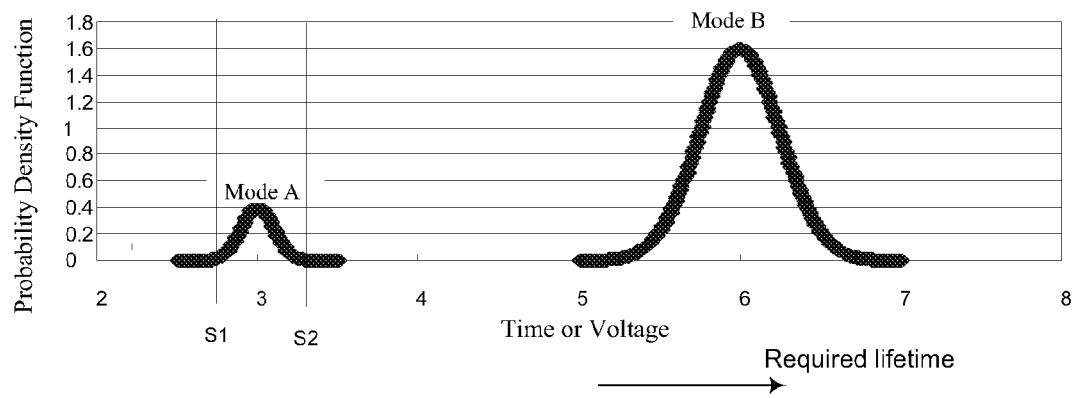
Figure 2A. The two populations in a sample test where Mode A represents early failures
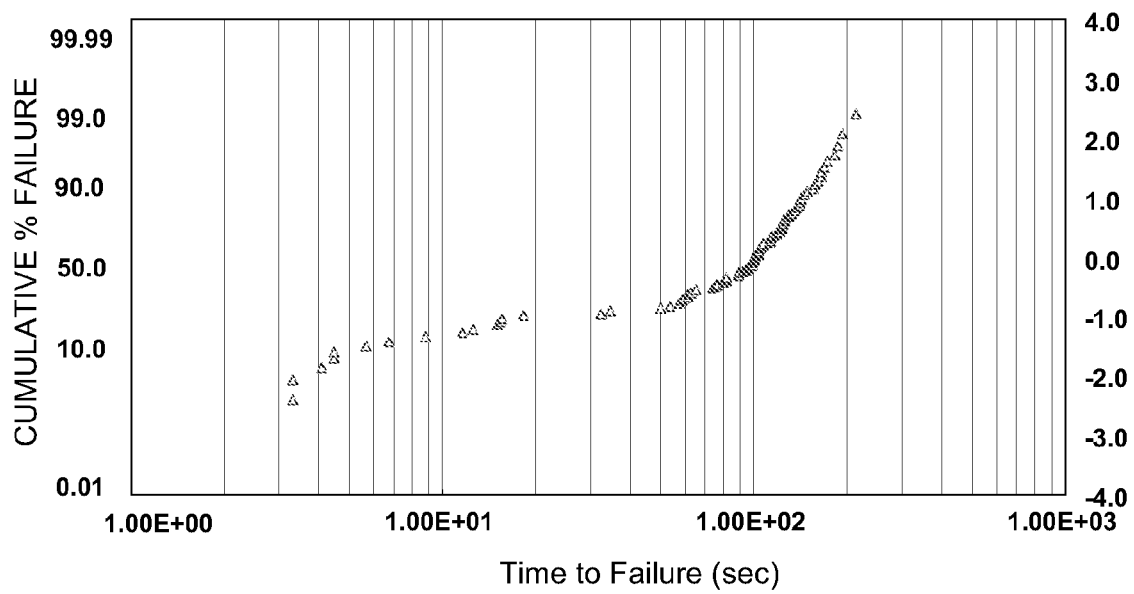
Fig. 2B. A cumulative failure distribution with bimodal

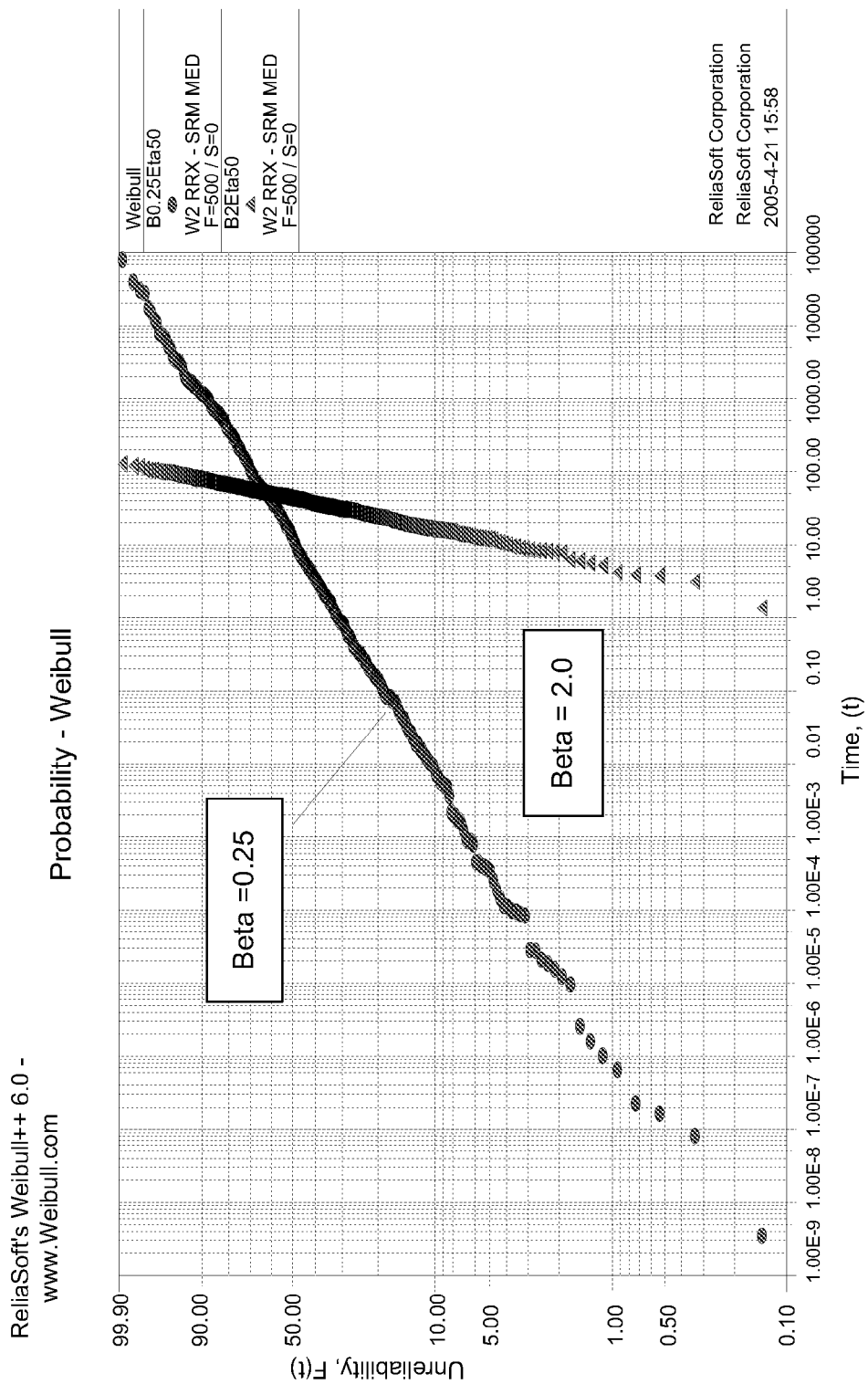
Figure 2C. Probability Plots of Weibull Distributions with one Beta >1 and one Beta <1.

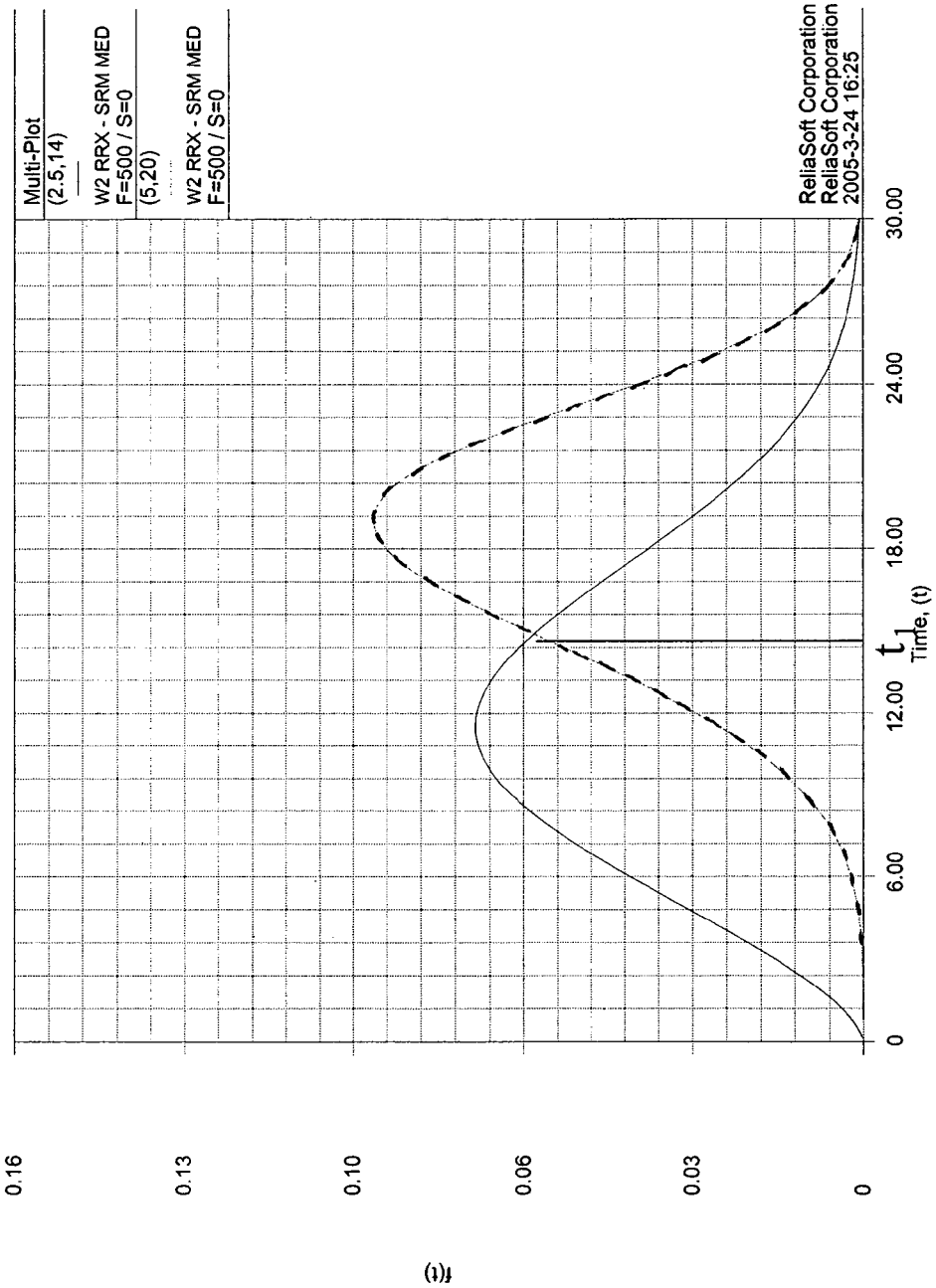
Figure 2D. Illustration of RC calculation of overlapping area under $f_1(t)$ and $f_2(t)$.

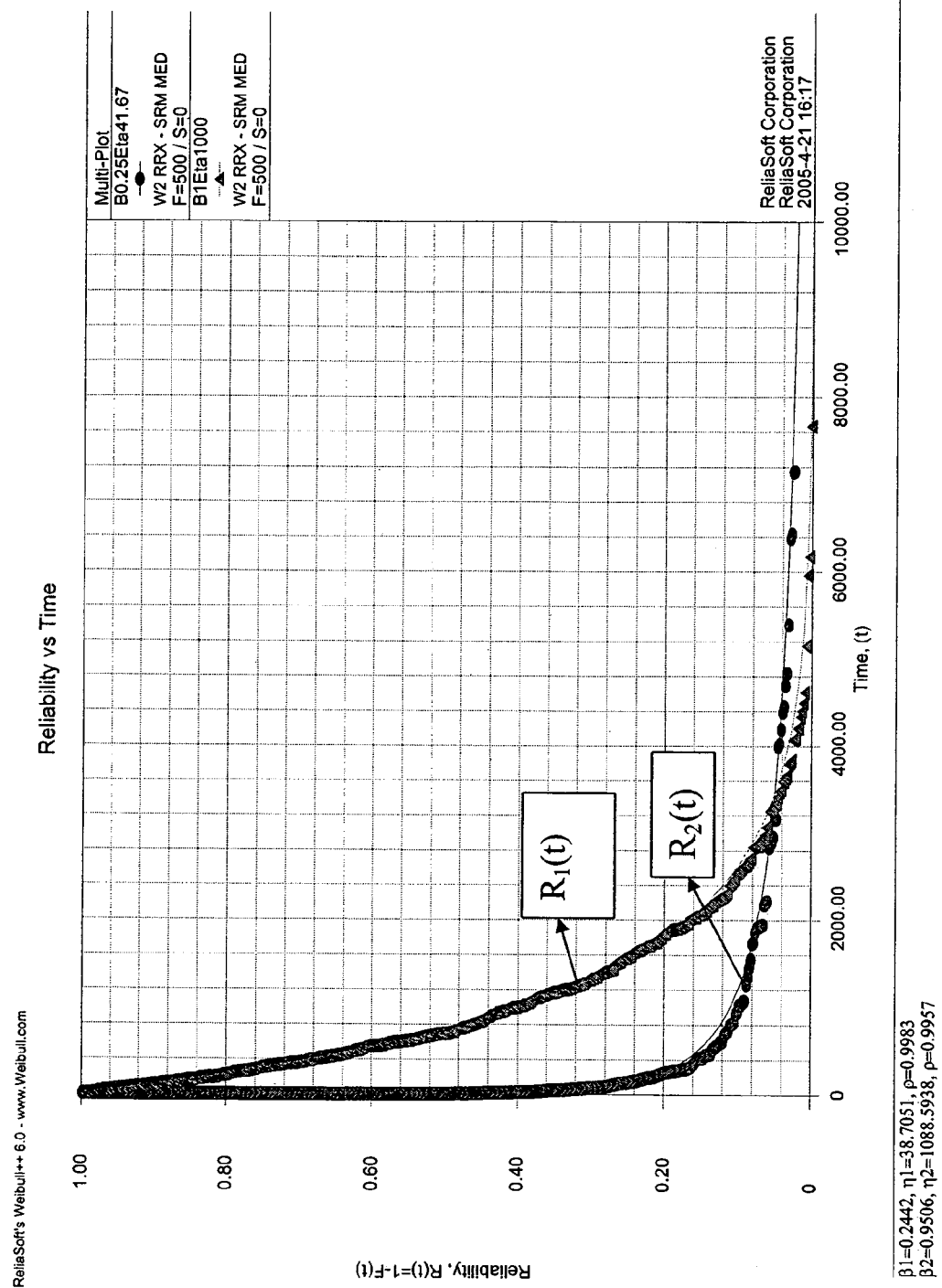
Figure 3. The reliability functions of Example 1

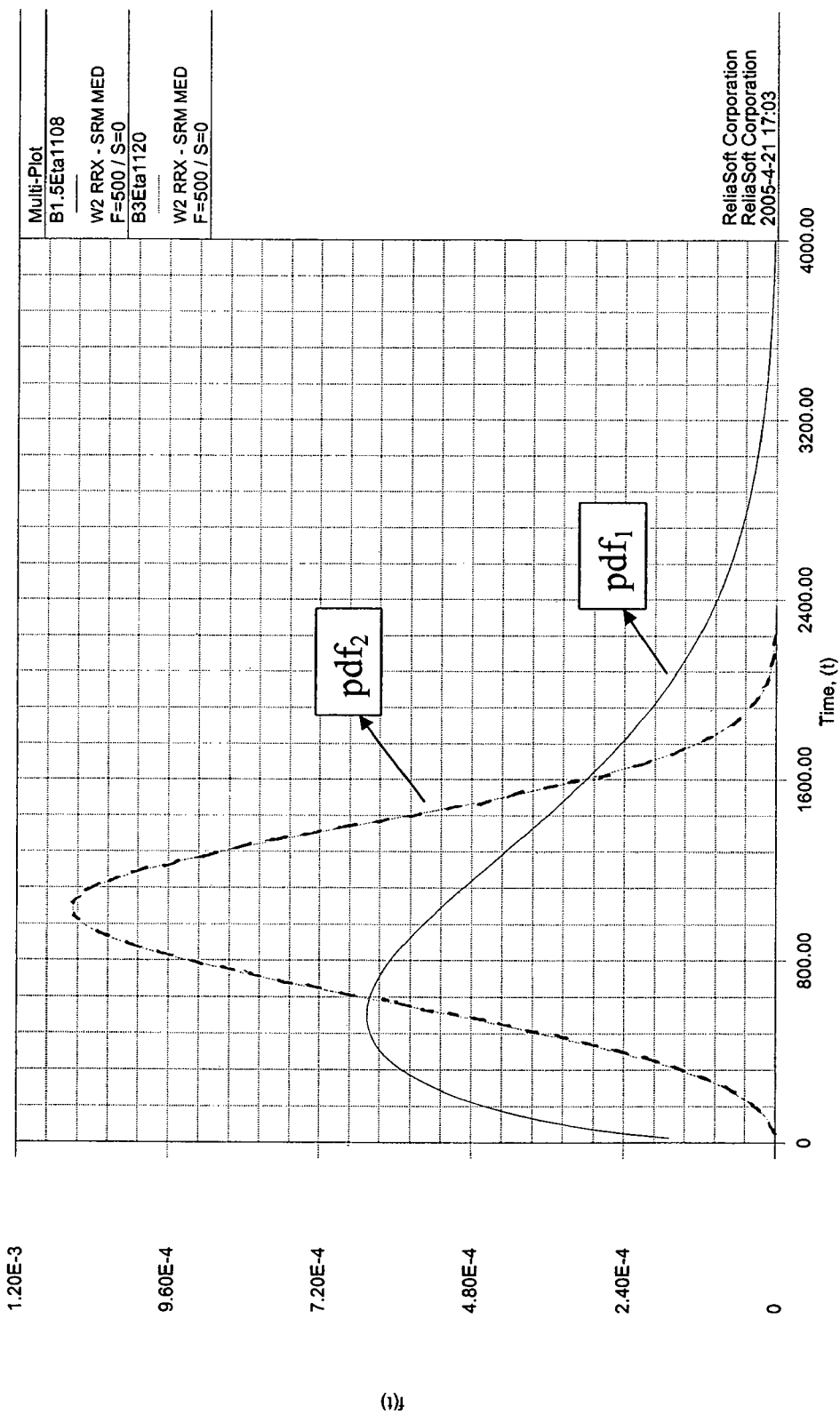
Figure 4. The pdf functions used in Example 3

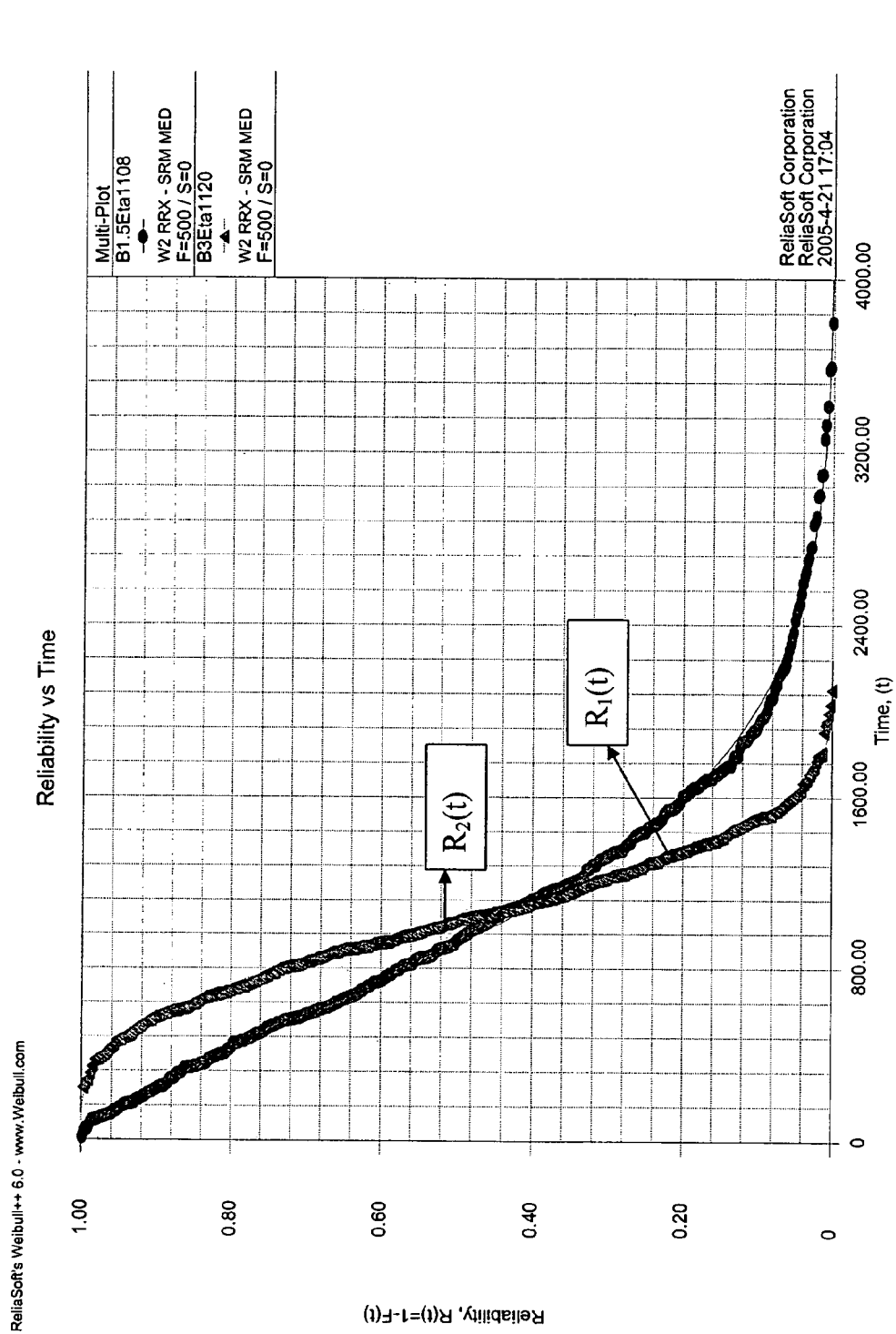
Figure 5. The reliability functions used in Example 3

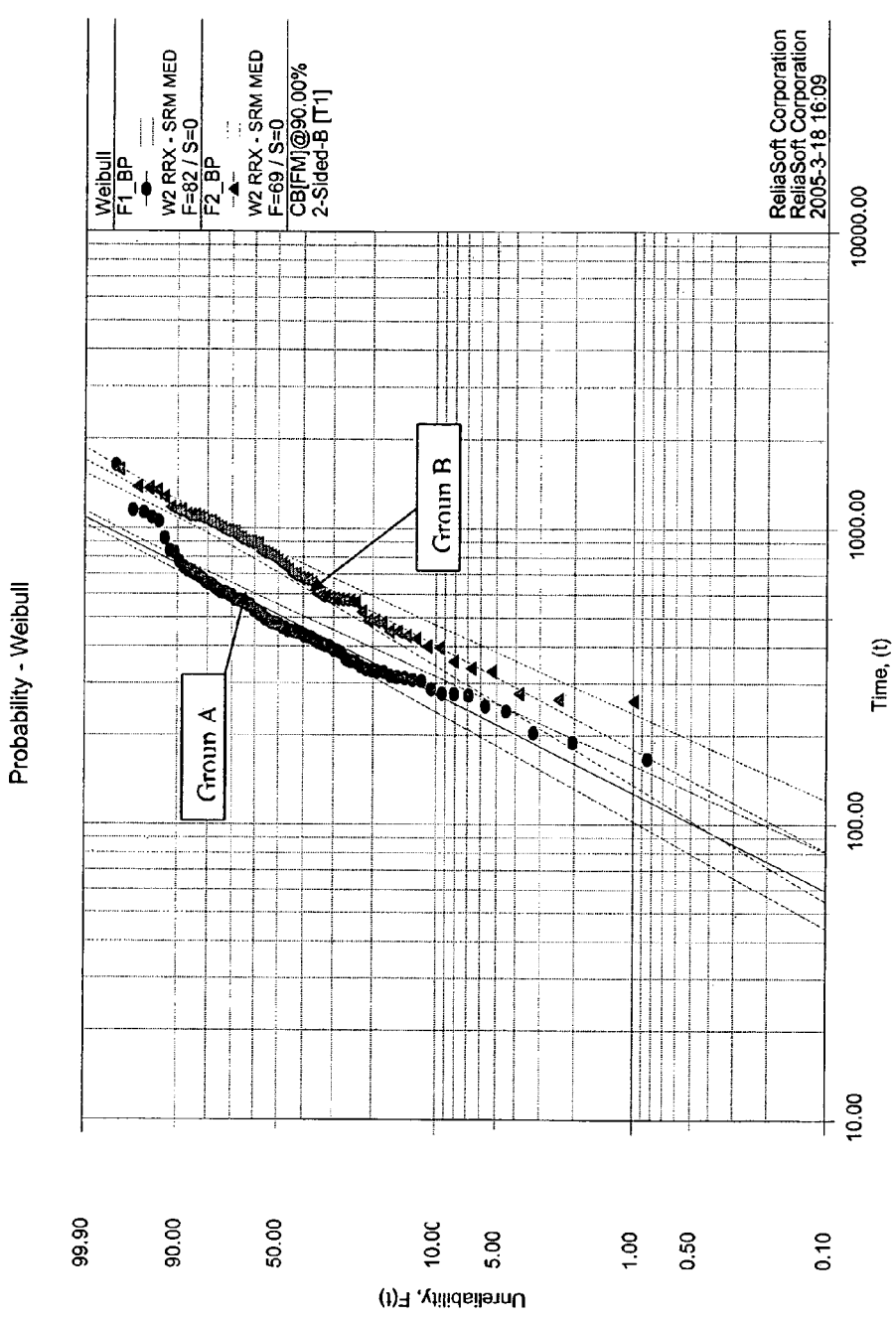
Figure 6. The Weibull probability plots in Example 3.

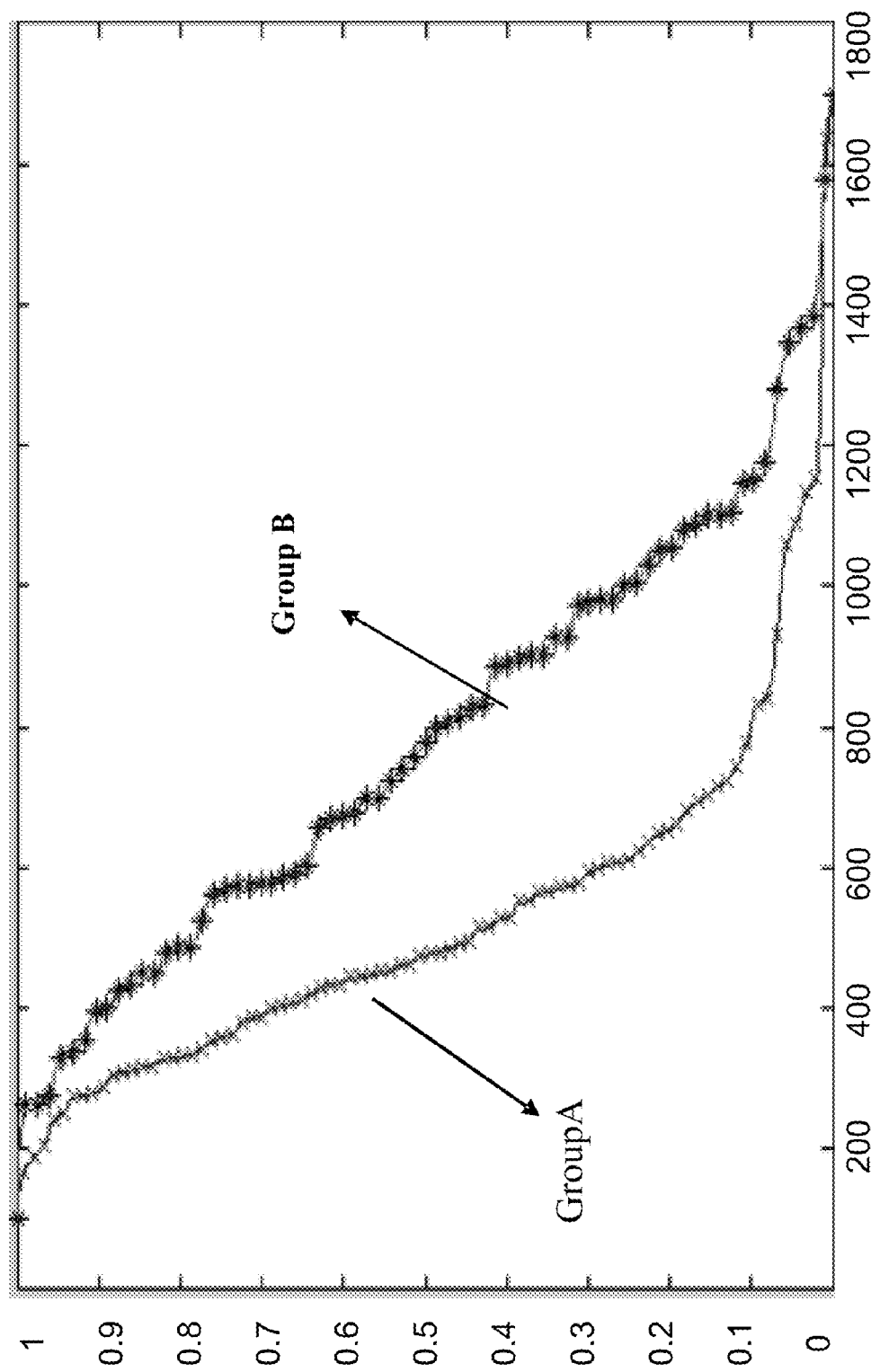
Figure 7. The reliability function vs time in Example 3

KNOWLEDGE-BASED STATISTICAL METHOD AND SYSTEM TO DETERMINE RELIABILITY COMPATIBILITY FOR SEMICONDUCTOR INTEGRATED CIRCUITS

CROSS-REFERENCES TO RELATED APPLICATIONS

This application claims priority to Chinese Patent Application No. 200510028650.8, filed Aug. 5, 2005, which is commonly owned and incorporated by reference herein for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

Certain portions of the present specification include computer codes, where notice is hereby give. All rights have been reserved under Copyright for such computer codes, by ©2004 and 2005 Semiconductor Manufacturing International (Shanghai) Corporation, which is the present assignee.

BACKGROUND OF THE INVENTION

The present invention is directed to integrated circuits and their processing for the manufacture of semiconductor devices. In particular, the invention provides a method and system for monitoring and controlling process related information for the manufacture of semiconductor integrated circuit devices. More particularly, the invention provides a method and system using a better or worse processes to monitoring and controlling process related information for the manufacture of semiconductor integrated circuit devices. But it would be recognized that the invention has a much broader range of applicability.

Integrated circuits have evolved from a handful of interconnected devices fabricated on a single chip of silicon to millions of devices. Conventional integrated circuits provide performance and complexity far beyond what was originally imagined. In order to achieve improvements in complexity and circuit density (i.e., the number of devices capable of being packed onto a given chip area), the size of the smallest device feature, also known as the device "geometry", has become smaller with each generation of integrated circuits.

Increasing circuit density has not only improved the complexity and performance of integrated circuits but has also provided lower cost parts to the consumer. An integrated circuit or chip fabrication facility can cost hundreds of millions, or even billions, of U.S. dollars. Each fabrication facility will have a certain throughput of wafers, and each wafer will have a certain number of integrated circuits on it. Therefore, by making the individual devices of an integrated circuit smaller, more devices may be fabricated on each wafer, thus increasing the output of the fabrication facility. Making devices smaller is very challenging, as each process used in integrated fabrication has a limit. That is to say, a given process typically only works down to a certain feature size, and then either the process or the device layout needs to be changed. Additionally, as devices require faster and faster designs, process limitations exist with certain conventional processes, including monitoring techniques, materials, and even testing techniques.

An example of such processes include ways of monitoring process related functions during the manufacture of integrated circuits, commonly called semiconductor devices. Such monitoring processes often include use of meantime to failures, commonly called "MTTF," among semiconductor devices produced with similar or the same process conditions and designs. As an example, a conventional test on comparing mean lives has been used to compare two different products, such as the MTTF of two Weibull distributions with equal shape parameters. However, two products with the same MTTF may have different reliabilities. In most cases, there is need to know if the reliability of two products are comparable. In such case, MTTF are not generally suitable indices because, even both products meet the lifetime requirement, the reliabilities may not be comparable. These and other limitations will be described in further detail throughout the present specification and more particularly below.

From the above, it is seen that an improved technique for manufacturing semiconductor devices is desired.

BRIEF SUMMARY OF THE INVENTION

According to the present invention, techniques directed to integrated circuits and their processing for the manufacture of semiconductor devices are provided. In particular, the invention provides a method and system for monitoring and controlling process related information for the manufacture of semiconductor integrated circuit devices. More particularly, the invention provides a method and system using a better or worse processes to monitoring and controlling process related information for the manufacture of semiconductor integrated circuit devices. But it would be recognized that the invention has a much broader range of applicability.

We desire to provide a method to compare the reliability of two groups regardless whether they can be fitted well by any well-known parametrically statistical distribution according to a specific embodiment.

In a specific embodiment, the present invention provides a method for manufacturing integrated circuit devices or other products and or processes. The method includes providing a first group (e.g., products, processes), which is characterized by at least a first design and a first set of processes. The method includes providing a second group, which is characterized by at least a first design and a first set of processes. The method includes identifying at least a first reliability characteristic associated with the first group and identifying at least a second reliability characteristic associated with the second group. The method includes determining a first reliability density function $R_1(t)$ of the first group. Preferably, the first reliability density function is associated with a time variable and the first reliability characteristic. The method includes determining second reliability density function $R_2(t)$ of the second group. Preferably, the second reliability density function is associated with the time variable and the second reliability characteristic. The method includes determining a failure probability density function associated with the first reliability function and the second reliability function. The method calculates a failure probability $f(t)$ for the first group and the second group from the failure probability density function from an initial time period to an infinite time period and normalizes the failure probability for the first group and the second group. The method determines an index value (e.g., better or worse (BOW)) using at least the normalized failure probability of the first group and the second group. The term BOW is not intended to be limiting, but is merely provided for descriptive purposes. That is, the functionality of the BOW index should be interpreted by one of ordinary skill in the art. In a preferred embodiment, the method determines the first reliability characteristic of the first group using at least the index associated with the failure probability of the first group and the second group and determines the second reliability characteristic of the second group using at least the index associated with the failure probability of the first group and the second group.

In an alternative specific embodiment, the present invention provides a method for manufacturing integrated circuit devices or other products and or processes. The method includes providing a first group (e.g., products, processes), which is characterized by at least a first design and a first set of processes. The method includes providing a second group, which is characterized by at least a first design and a first set of processes. The method includes identifying at least a first reliability characteristic associated with the first group and identifying at least a second reliability characteristic associated with the second group. The method includes determining a first reliability density function $R_1(t)$ of the first group. Preferably, the first reliability density function is associated with a time variable and the first reliability characteristic. The method includes determining second reliability density function $R_2(t)$ of the second group. Preferably, the second reliability density function is associated with the time variable and the second reliability characteristic. The method includes determining a failure probability density function associated with the first reliability function and the second reliability function. The method calculates a failure probability f(t) for the first group and the second group from the failure probability density function from an initial time period to an infinite time period. The method determines an index value (e.g., better or worse (BOW)) using at least the failure probability of the first group and the second group. The term BOW is not intended to be limiting, but is merely provided for descriptive purposes. That is, the functionality of the BOW index should be interpreted by one of ordinary skill in the art.

In an alternative specific embodiment, the invention provides a method and system to compare the combination of several reliability tests of two groups (e.g., products, processes, technologies). Examples (but not limited to) of such occasion, especially for the semiconductor industries, are HCI (Hot Carrier Injection), Vt (Threshold voltage test), GOI (Gate Oxide Integrity)-Vbd (Breakdown voltage)/-TDDB (Time Dependent Dielectric Breakdown), EM (Electro-migration), and so on. Depending upon the embodiment, the present invention may also include a method and system for pre-check to handle bi-modal, early failures, and different failure behaviors (i.e., IFR & DFR), which ensures wide applicability.

In alternative embodiments, the present methods introduced can be used not only for lifetime comparison, but also other random variables, such as break down voltage, or threshold voltage shift, etc. In microelectronic device threshold voltage shift, a definition of BOW has to reverse and exchange the subscripts of the two groups since a smaller threshold voltage shift, device reliability performance is often better.

In yet an alternative specific embodiment, the BOW and RC introduced can be used either for the raw data of lifetimes to failure (e.g., the 30 failure times from the 30 samples in an EM test) or the raw data which is lumped from all tests (e.g., the 120 EM failure times lumped from 4 EM tests using the same product), or the derived parameters fitted from each single test (e.g., Beta of a Weibull distribution, $t_{0.1\%}$, Ea & n of the EM test, and Ea & B of a TDDB test). Depending upon the embodiment, the present method and systems can also use suitable coloring schemes to present RC or other parameters. For example, for some reliability items, we can propose the arrangement as:

a. Green (→good matching): RC≧90%
b. Yellow (→medium matching): 80%≦RC<90%
c. Red (→poor matching): RC<80%

Depending upon the embodiment, engineering judgment determines certain color zone boundaries and different reliability items could have different color zone boundaries. Of course, one of ordinary skill in the art would recognize other variations, modifications, and alternatives.

In a specific embodiment, the present invention provides a computer based system for manufacturing more than two products. The system includes one or more computer codes on one or more memories. One or more codes is directed to receiving a first group of electronic information and one or more codes is directed to receiving a second group of electronic information. The system has one or more codes directed to identifying at least a first reliability characteristic associated with the first group and identifying at least a second reliability characteristic associated with the second group. The system has one or more codes directed to determining a first reliability function R1(t) of the first group. One or more codes is directed to determining second reliability function R2(t) of the second group. One or more codes is directed to determining a failure probability density function associated with the first reliability function and the second reliability function. One or more codes is directed to calculating a failure probability f(t) for the first group and the second group from the failure probability density function from an initial time period to an infinite time period. One or more codes is directed to determining the first reliability characteristic of the first group using at least the failure probability of the first group and the second group. The system also has one or more codes directed to determining the second reliability characteristic of the second group using at least the index associated with the failure probability of the first group and the second group. Depending upon the embodiment, certain codes may be added, other removed, and others integrated with each other or other codes. Various functionality of the present invention can be carried out using computer codes, which will be further described throughout the present specification and more particularly below.

Many benefits are achieved by way of the present invention over conventional techniques. For example, the present technique provides an easy to use process that relies upon conventional technology. In some embodiments, the method provides higher device reliability and performance. In a preferred embodiment, the present method and system provides for robust analysis between two or more groups, which also may provide for root cause analysis and identification. Additionally, the method provides a process that is compatible with conventional process technology without substantial modifications to conventional equipment and processes. Preferably, the invention provides for improved process integration for design rules of 0.13 microns and less. Additionally, the invention provides a more accurate solution than the conventional parametric method on reliability comparison since certain conventional parametric methods often results in certain errors from the goodness-of-fit and parameter estimations in a specific embodiment. Preferably, the present invention provides a method and system that is free from an assumption on lifetime distribution according to a specific embodiment. By the proposed numerical analysis approach, we obtain solutions with good accuracy without assuming any lifetime distribution, which also makes our approach more viable to industrial practitioners according to certain embodiments. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 2 (including FIGS. 2A, 2B, 2C, and 2D) shows exemplary bimodal distributions with different graphing techniques of some reliability tests on microelectronic products according to embodiments of the present invention. [Usually, bimodal implies there are more than one failure mechanisms, which need to be segregated before further failure or data analyses. We may further analyze the data when the two (say) mechanisms are identified and separated; their failures may be modeled by two different Weibull distributions as shown in FIG. 2C, where one has DFR (Beta<1, like mode A) and the other, IFR (Beta>1, like mode B).];

FIG. 3 is a simplified diagram of reliability functions according to embodiments of the present invention.

FIG. 4 is a simplified diagram of probability density functions according to an embodiment of the present invention.

FIG. 5 is a simplified diagram of reliability functions according to embodiments of the present invention.

FIG. 6 is a simplified diagram of Weibull probability plots according to embodiments of the present invention.

FIG. 7 is a simplified diagram of reliability functions plotted against time according to embodiments of the present invention.

DETAILED DESCRIPTION OF THE INVENTION

Figure 1A:
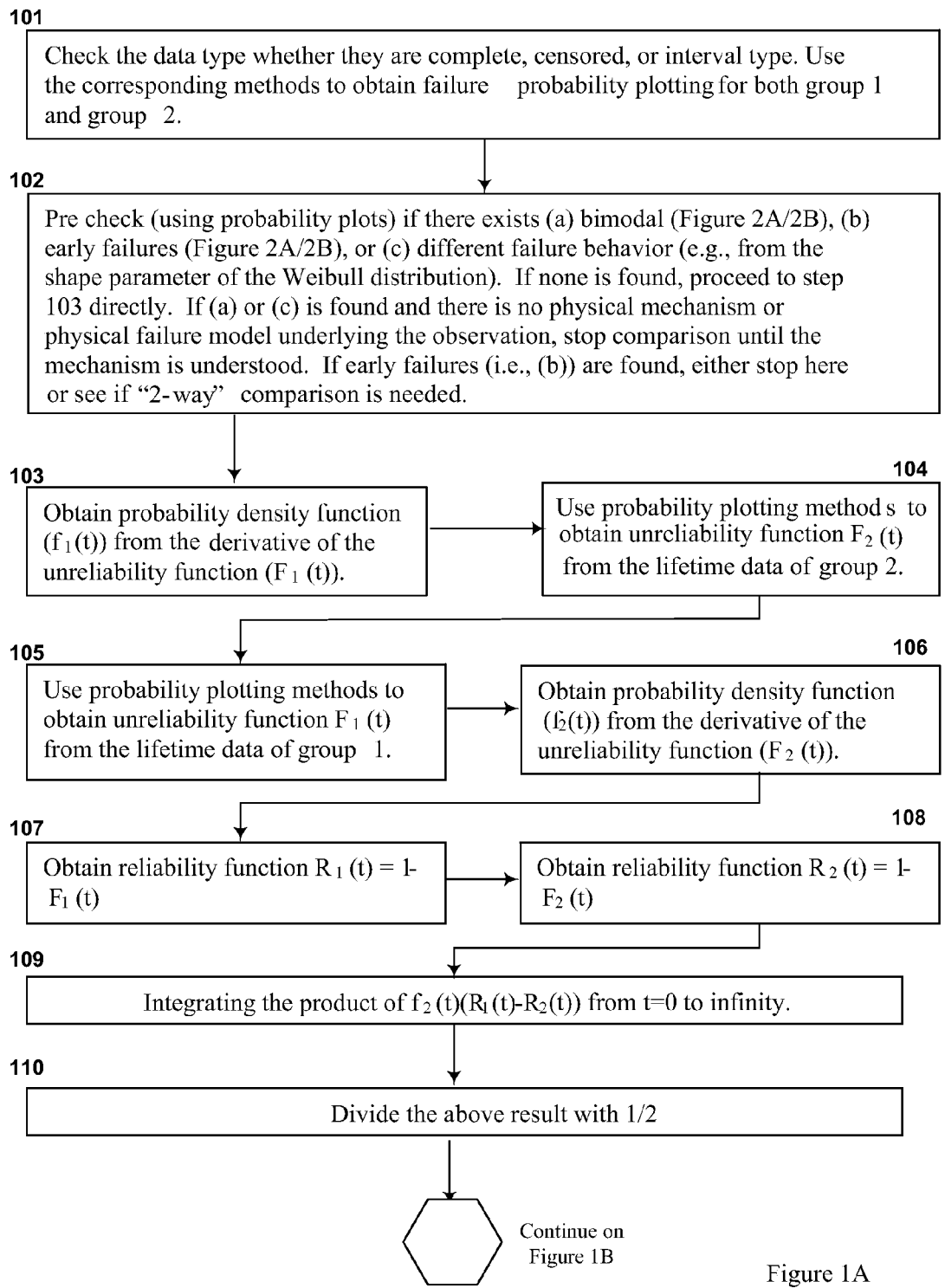
FIG. 1 (including FIGS. 1A and 1B) is a simplified flow diagram that depicts certain steps of a method of determining reliability comparability indexes according to an embodiment of the present invention.

According to the present invention, techniques directed to integrated circuits and their processing for the manufacture of semiconductor devices are provided. In particular, the invention provides a method and system for monitoring and controlling process related information for the manufacture of semiconductor integrated circuit devices. More particularly, the invention provides a method and system using a better or worse processes to monitoring and controlling process related information for the manufacture of semiconductor integrated circuit devices. But it would be recognized that the invention has a much broader range of applicability. That is, the present invention is related to the filed of statistical quality control in reliability engineering and is more specifically related to a method to determine the reliability comparability (RC) for the reliability tests done on certain types such as products, components, subsystem, and systems. Before discussing details of the various embodiments, we have defined the following terms, which are intended not to be limiting in any manner. Such definitions are merely provided to assist the reader.

DEFINITIONS 1. f(t): Failure Probability Density Function (pdf).
2. F(t): Cumulative Distribution Function (CDF)

$$F(t) = \int_0^t f(t)dt$$

3. R(t): Reliability Function. R(t)=1−F(t).
4. r(t): Failure Rate Function.

$$r(t) = -\frac{dR(t)/dt}{R(t)}$$

5. Γ(n): Gamma Function.

$$\Gamma(n) = \int_0^\infty e^{-x} x^{n-1} dx$$

6. MTTF: Mean Time To Failure, mean life of a distribution.

$$MTTF = \int_0^\infty tf(t)dt$$

7. $t_{0.1\%}$: Lifetime at the level of 0.1% failed life.
8. $t_{1ppm}$: Lifetime at the level of 1 ppm (one part per million) failed life.
9. Group: A group used here can be a set of lifetime data from a single test under certain stressed condition, or can be the lumped lifetime data from multiple tests under the same stressed condition from the same type of product. It can be extended further to any form of distribution of reliability data (from, e.g., products, processes, technologies, systems, subsystems, and components).
10. BOW: Better Or Worse, an index introduced in this invention for the comparison of reliability lifetimes
11. RC: Reliability Comparability, an index introduced in this invention for the degree of reliability similarity between two groups of any forms.
12. Beta: The shape parameter for the Weibull distribution. When Beta>1, Beta=1, and Beta<1, we have a increasing failure rate (IFR), constant failure rate (CFR), and decreasing failure rate (DFR), respectively.
13. Eta: The scale parameter for the Weibull distribution.

As noted, these definitions are merely provided to assist the reader. One of ordinary skill in the art would recognize other variations, modifications, and alternatives. Further details of the present invention can be found throughout the present specification and more particularly below.

It is often important technologies stay competitive especially in today's highly globalized world markets. We have to know product reliability, have to be able to control it, and have to manufacture the products at an improved and/or optimal reliability level with a minimum life-cycle cost. It is then often desirable to compare and to determine whether two different products that perform the same functions differ in reliability. These two products under comparison could be two products of the same design but from different manufactories, or a redesigned product vs. the original design, or the two products of the same design and from same manufactory but stressed at two different levels. In literature, there are many parametric statistical methods (e.g., Lee J. Bain and Max Engelhardt, "Statistical Analysis of Reliability and Life-Testing Models: Theory and Methods", Marcel Dekker, Inc., 1991, pp 42-89; Wayne Nelson, "Accelerated Testing: Statistical Models, Test Plans, and Data Analyses", John Wiley & Sons, 1990, pp 425-450; and Dimitri Kececioglu, "Reliability and Life Testing Handbook", Vol. 1, PTR Prentice Hall, 1993, pp 525-565 ("Kececioglu")) to compare estimated distribution parameters, distribution spreads, mean lifetime, or percentage failing during warranty, by statistical inferences at certain confidence levels. However, such parametric methods are limited only to indicate whether the observed differences are statistically significant and can only deal with certain known distributions without the information on reliability assessment.

Referring to Kececiogu above, a conventional test on comparing mean lives was used to compare two different products, such as the MTTF of two Weibull distributions with equal shape parameters. However, two products with the same MTTF may have different $t_{0.1\%}$. Therefore, some also specify $t_{0.1\%}$ or 1 ppm as an index in reliability comparison. In most cases, there is need to know if the reliability of two products are comparable. For example, customers are most interested in knowing if their products can be made by different production lines without generating unacceptable quality and reliability discrepancies. In such case, $t_{0.1\%}$ and MTTF are not suitable indices because, even both products meet the lifetime requirement, the reliabilities may not be comparable. Besides, the derived $t_{0.1\%}$ is also a statistic with random variation, therefore the comparison of $t_{0.1\%}$ between two groups is not suitable when they are close to each other (see, for example, FIG. 6). It is worthwhile to point out here that a larger MTTF does not guarantee a better reliability because the failure distribution may be skewed at the lower-left end, for example, and lead to very early rejects at field use. Early field failures usually lead to enormous loss on credibility and financial compensations for suppliers. Further details of the present methods and systems can be found throughout the present specification and more particularly below.

EXAMPLE 1

This example demonstrates that two products with two designs have the same MTTF but one product has higher probability to outlast another. For simplicity on calculation & presentation, we assume their lives can be modeled by the Weibull distribution: the first product has Beta=1.0 and Eta=1000, and the second, Beta=0.25 and Eta=41.67. For the first product, $$MTTF = \eta\Gamma\left(\frac{1}{\beta}+1\right) = 1000\Gamma\left(\frac{1}{1.0}+1\right) = 1000 \text{ hours.}$$

For the second product, $$MTTF = 41.67\,\Gamma\left(\frac{1}{0.25}+1\right) = 1000 \text{ hours.}$$

These two products have same MTTF.

However, from the reliability function plots in FIG. 3, we can see that majority of the product 2 failed at very short life with only a very small portion survived at very long life. In most cases, customers concern more on the reliability at early stage due to the short product lifecycle, for example. Furthermore, the reliability difference between these two products after 3,000 is negligible. Under these circumstances, product 1 is preferred. Besides, product 1 has CFR (Beta=1) and product 2, DFR (Beta=0.25<1). This indicates these two products have different failure behaviors and mechanisms. Products with DFR are widely seen in the microelectronic components like transistors, and integrated circuits (IC's).

For CFR, it possesses the so-called "memory less" property, which means once the product is working, it is as good as new such as the light bulbs. On the other hand, for Beta>1, we have IFR and it is mainly due to material wear-out. The FIG. 2C gives probability plots of Weibull distributions with one Beat>1 and one Beta<1.

It is worthwhile mentioning here that, due to the transparently practical indication of the Weibull shape parameter (Beta), we apply the Weibull plot in our pre-check to ensure the two groups we are comparing have the same failure behaviors.

The following functions are the important ones in reliability and life testing. (1) The failure probability density function f(t) (pdf). 0<t<∞, (2) The reliability function R(t).

$$R(t) = 1 - \int_0^t f(t)dt.$$

(3) The failure rate function r(t).

$$r(t) = -\frac{\frac{dR(t)}{dt}}{R(t)}.$$

For any types of distributions, we have the following universal relationship between any two different distributions.

$$\int_0^\infty [f_2(t)-f_1(t)][R_2(t)-R_1(t)]dt \equiv 0 \qquad \text{Eq. (1)}$$

or $$\int_0^\infty f_2(t)[R_1(t)-R_2(t)]dt \equiv \int_0^\infty f_1(t)[R_1(t)-R_2(t)]dt \qquad \text{Eq. (1')}$$

and $$\int_0^\infty f_1(t)R_1(t)dt \equiv \int_0^\infty f_2(t)R_2(t)dt \equiv \frac{1}{2} \qquad \text{Eq. (2)}$$

When these two distributions are identical, we have $$\int_0^\infty f_2(t)[R_1(t)-R_2(t)]dt = 0.$$

When it is not zero, the sign of the integral $$\int_0^\infty f_2(t)[R_1(t)-R_2(t)]dt$$

reflects whether the group 1 has higher probability to outlast group 2. When its sign is positive, it indicates that the times to failure of group 1 outlast group 2. When its sign is negative, it means that the times to failure of population of group 2 is better than population of group 1. This can be used as an indicator to compare the reliability of two different groups besides the early mentioned lifetime at the 0.1% failed life. Since there is universal relationship of Eq (2), we normalize the integral with $$\int_0^\infty f_1(t)R_1(t)dt \equiv \int_0^\infty f_2(t)R_2(t)dt \equiv \frac{1}{2}$$

and formed an index, called BOW (Better or Worse).

$$BOW \equiv \frac{\int_0^\infty f_2[R_1(t) - R_2(t)]dt}{\int_0^\infty f_2(t)R_2(t)dt}$$

which ranges from −1 to +1.

The definition of BOW can also be presented by the following expression from the properties in Eq. (1') and Eq. (2).

$$BOW \equiv \int_0^\infty [f_1(t) + f_2(t)] * [R_1(t) - R_2(t)]dt$$

This expression represents the weighted integral of survival difference between two groups, which gives a clearer picture on physical meanings.

When these two groups have identical distribution, we will have BOW=0. In other words, the probability that the times to failure of group 1 are better than the times to failure of the group 2 is 0. When these distributions are farther apart each other, BOW approaches to either −1 or +1, depending on which one outlasts another in lifetime. When BOW=+1, group 1 is better than group 2 with probability 1. When BOW=−1, group 2 is better than group 1 with probability 1.

The following expression of Eq. (3) shows the permutation properties of the BOW definition. When the subscripts of pdf f(t) and reliability function R(t) are permuted, the value of BOW will change the sign only but keep the same magnitude.

$$\int_0^\infty f_2(t)[R_1(t) - R_2(t)]dt \equiv -\int_0^\infty f_1(t)[R_2(t) - R_1(t)]dt \quad Eq.\ (3)$$

$$\text{or} \int_0^\infty [f_1(t) + f_2(t)] * [R_1(t) - R_2(t)]dt = \quad Eq.\ (3')$$

$$-\int_0^\infty [f_2(t) + f_1(t)] * [R_2(t) - R_1(t)]dt$$

Another index can be derived to give index of how close these two distributions are regardless which one has superior reliability to another in terms of population lifetimes. The size of the overlapping area under pdf $f_1(t)$ and $f_2(t)$ reflects how these two distributions are close to each other (see FIG. 2D), and therefore is defined as the index RC (Reliability Comparability).

$$\text{Reliability Comparability}(RC) = \int_0^{t1} f_2(t)dt + \int_{t1}^\infty f_1(t)dt$$

where $t_1$ is the intersecting point of lifetime between pdf $f_1(t)$ and $f_2(t)$, i.e., $f_1(t_1)=f_2(t_1)$ (FIG. 2D).

When there are multiple intersecting points of lifetime ($t_1$, $t_2$, $t_3$, etc.) between pdf $f_1(t)$ and $f_2(t)$, then the general definition of RC is $$RC = \int_0^{t1} f_x(t)dt + \int_{t1}^{t2} f_y(t)dt + \int_{t2}^{t3} f_z(t)dt + \dots$$

where $f_x(t)$ is the smaller pdf between lifetimes from 0 to $t_1$, and $f_y(t)$ is the smaller pdf between lifetimes from $t_1$ to $t_2$, and so on.

The range of RC is from 0 to 100%.

RC has different physical meanings from BOW. RC evaluates the difference between two distributions ignoring whether one distribution has higher or lower probability of longer lifetimes; while BOW compares if the overall probability of one group has higher or lower lifetimes than the other. If two groups are swapped, RC remains the same and BOW will have an opposite sign with the same absolute value. The relationship between RC and BOW is that the smaller the absolute value of BOW is, the larger the RC value becomes. Two identical distributions will have the maximum RC (i.e., RC=100%), and vice versa. That is, if RC=100%, these two distributions are identical. However, when BOW has its minimum absolute value (i.e., BOW=0), it does not mean RC=100%. In other words, it does not imply these two distributions are identical. When two normal distributions with the same mean but different sigma's, the BOW=0 but they are not identical. Therefore, their RC will be less than 100%. In other words, if RC=100%, we will have BOW=0; however, if BOW=0, RC does not necessarily equal to 100%.

EXAMPLE 2

Consider two groups with Weibull distribution lives:
Group 1: (Beta, Eta)=(1.5, 1108); MTTF=1000
Group 2: (Beta, Eta)=(3.0, 1120); MTTF=1000

They passed the pre-check since both Beta's are larger than 1.0. Their reliability functions and pdf are in FIG. 4 and FIG. 5, respectively.

Although they both have the same MTTF (=1000), they have BOW=−12% and RC=71%. The probability that group 2 outlasts group 1 is 12% and their reliability comparability is 71%.

To sum up, when the comparisons are on the conventional lifetime indices, like $t_{0.1\%}$ or $t_{1ppm}$ and which are close together as in many practical cases, using BOW can make robust judgment. In the cases when $t_{0.1\%}$ comparison has no uncertainty and both meet Spec., both BOW and RC can still be used to give a normalized indicator of how far they are off each other. The practical case below highlights the power of BOW when the two $t_{0.1\%}$'s are close together and is difficult to draw conclusions by conventional comparisons.

EXAMPLE 3

The data from group A and B shown in FIG. 6 are the results of a reliability test X, which can be presumably modeled by a 2-parameter Weibull distribution.

The confidence bounds indicate that it is uncertain to distinguish these two groups' $t_{0.1\%}$'s, which are by extrapolation. It is because that the data are not perfectly fitting into Weibull distributions. BOW is 0.50, which indicates there is significant difference between these two groups. Their reliability functions vs. time are in FIG. 7, which also confirms the big difference between these two groups.

BOW & RC do not require parametric fitting. The general numerical approaches existing in literature for the reliability function (R(t)) fitting, and derivation to obtain numerical pdf f(t), and integral of the group of $f_1(t)$ and $[R_2(t)-R_1(t)]$ provide higher accuracy than the parametric approaches.

BOW and RC are applicable either for the raw data of lifetimes (e.g., GOI, EM) or derived parameters from each test (e.g., MTTF, sigma, $t_{0.1\%}$, $t_{1ppm}$, Ea of the EM & TDDB tests). The interpretation of BOW will be different accordingly. The data can be either lifetime, or voltage of breaking down, or Vt shift. The interpretation of BOW will change accordingly. Example 3 is also a practical case when $t_{0.1\%}$ comparison is difficult due to the deviation from the fitting lines in Weibull plot. Both BOW and RC can take care of this kind of deviation, which is quite common in real cases. This is the powerful part of these two invented indices.

The data type can be either complete type (no censoring) or with censoring. The probability plot methods will be different with different data types. The probability plotting methods can be found from standard textbook in reliability statistics.

A microelectronic device product normally has multiplicity of reliability testing such as HCI (Hot Carrier Injection), Vt (Threshold Voltage Shift), GOI (Gate Oxide Integrity), EM (Electromigration), HTOL (High Temperature Operation Life), EFR Earlier Failure Rate), etc. Of course, there can be other types of testing recognized by one of ordinary skill in the art.

In some cases such as GOI Vbd test in microelectronic device, there is extrinsic failure mode besides intrinsic failure mode. FIG. 2A and FIG. 2B show two different modes as an example of mode A and mode B. It is also important to compare the extrinsic mode A with the same indexes introduced in this invention if the physical mechanism or physical failure mode underlying mode A is known. Mostly, the data points of mode A (which is often called early failure) are sparse from a single GOI Vbd test. However, we can lump several Vbd mode A raw data from all tests from the same product manufactured in the same FAB to do the comparison with another product from another FAB. The combination of BOW and RC between two products for both mode A & B, and relative percentage of these two modes are all needed to be included in comparison of two products from all aspects.

Figure 1B:
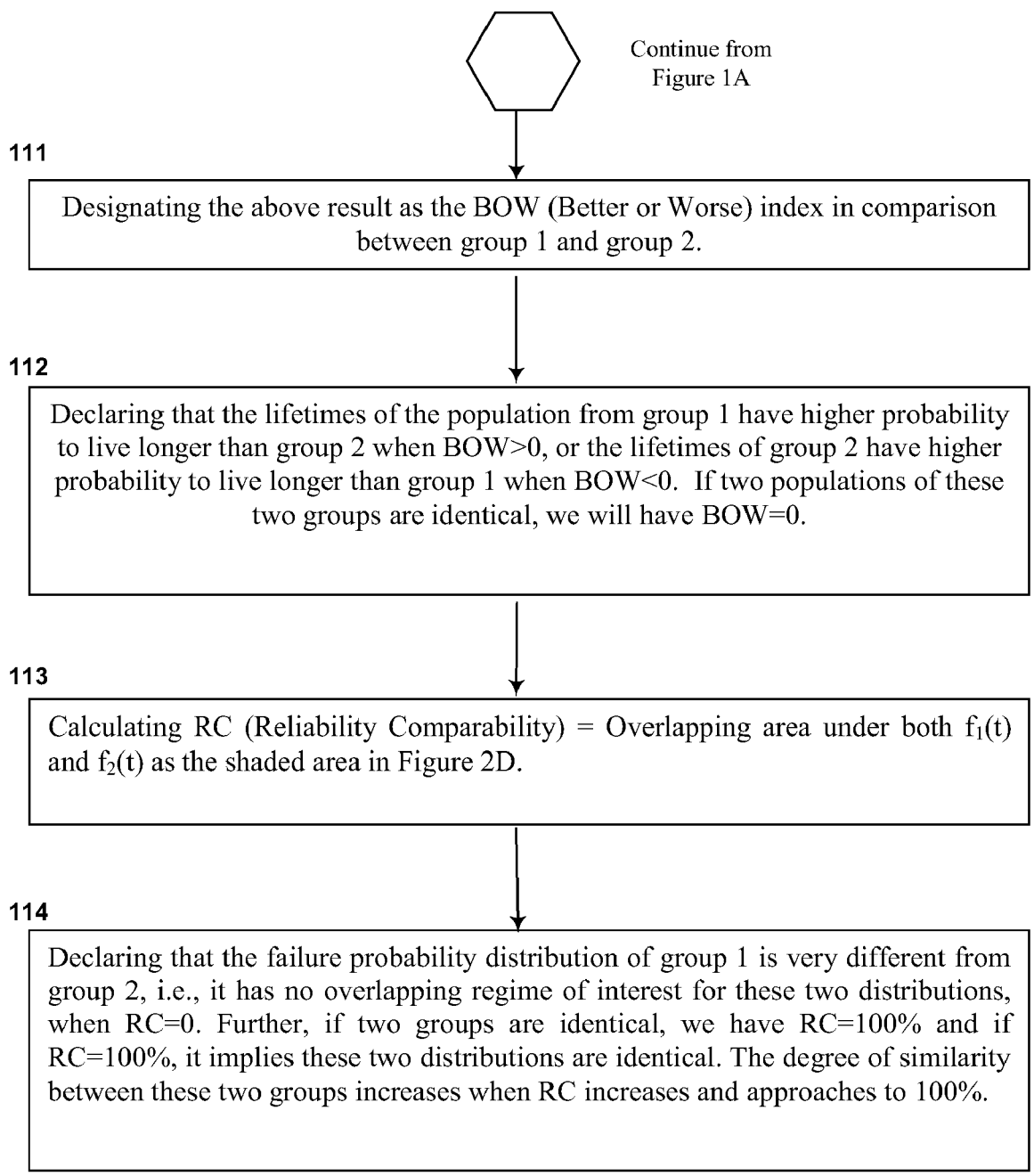

FIG. 1 is a simplified flow diagram that depicts an exemplary embodiment of the invention. This diagram is merely an example, which should not unduly limit the scope of the claims herein. One of ordinary skill in the art would recognize many variations, alternatives, and variations. As shown, the diagram illustrates a method with which a microelectronic manufacturer or microelectronic product end user may determine whether two microelectronic products from two different fabrication factories (FABs), or two products with different design versions, or two products stressed at two different stress levels, have the same reliability lifetime performance, or which product outlasts the other product if their reliability performance differ. Considering the aforementioned possible multiple applications, the term of "group" is used in FIG. 1 as an exemplary illustration.

In step 101, the method that can be found in literature is used to obtain the failure probability plots for both group 1 and 2.

In step 102, pre check, using probability plots, if there exists (a) bimodal, (b) early failure, or (c) different failure behavior (e.g., the shape parameter, Beta, of the Weibull distribution). If none of the three is found, go to step 103 directly. If (a) (as shown in FIG. 2) or (c) is found and there is no physical mechanism or physical failure model underlying mode A, stop comparison until the mechanism is understood. As in FIG. 2A, we cannot remove all early failures if we screen mode A at S1. All of mode A can be screened if we set the screening time to be at S2. Hence, if initial failures (i.e., (b)) are found, either stop here or decide if "2-way comparison" is needed.

The 2-way comparison:
1. BOW should be calculated for Mode A and B separately. If the required lifetime is what indicated in FIG. 2A and mode A is completely screened, we only have to calculate BOW for mode B.
2. If data points of Mode A are so sparse that we cannot fit them to a distribution, we may either accumulate more data or simply conclude these is early failure if the Mode A points are confirmed to be solid rejects. In such cases, we will calculate the BOW for Mode B only.

In step 103, the probability plotting method can be used to obtain the failure probability plot and therefore the unreliability function $F_1(t)$ from the lifetime data of group 1.

In step 104, the probability plotting method can be used to obtain the failure probability plot and therefore the unreliability function $F_2(t)$ from the lifetime data of group 2.

In step 105, one obtains the pdf $f_1(t)$ from the derivative of the unreliability function $F_1(t)$ obtained in step 104.

In step 106, one obtains the pdf $f_2(t)$ from the derivative of the unreliability function $F_2(t)$ obtained in step 104.

In step 107, one obtains the reliability function $R_1(t)=1-F_1(t)$ for group 1 from the $F_1(t)$ obtained from step 103.

In step 108, one repeats the step 107 for group 2 to obtain the reliability function $R_2(t)=1-F_2(t)$.

In step 109, one integrates the product of $f_2(t)$ $[R_1(t)-R_2(t)]$ from t=0 to infinity.

In step 110, one divides the result from step 108 with ½.

In step 111, one designates the result from step 109 as the BOW (Better or Worse) index in comparison between group 1 and 2.

In step 112, one declares that the lifetimes of the population from group 1 have higher probability to live longer than group 2 when BOW>0, or the lifetimes of group 2 have higher probability to live longer than group 1 when BOW<0. If two populations of these two products are identical, we will have BOW=0.

In step 113, one calculates RC (Reliability Comparability)= Overlapping area under both $f_1(t)$ and $f_2(t)$.

In step 114, one declares that the failure probability distribution of group 1 is very different from group 2, i.e., it has no overlapping regime of interest for these two distributions, when RC=0. Further, if two groups are identical, we have RC=100% and if RC=100%, it implies these two distributions are identical. The degree of similarity between these two groups increases when RC increases and approaches to 100%.

The above sequence of steps provides a method according to an embodiment of the present invention. As shown, the method uses a combination of steps including a way of evaluating at least two groups of entities in the manufacture of integrated circuits. Other alternatives can also be provided where steps are added, one or more steps are removed, or one or more steps are provided in a different sequence without departing from the scope of the claims herein.

Experiment

To prove the operation and functionality of the present invention, we performed certain experiments using computer code on a personal computer based system. The present computer code was provided on a program called Matlab developed by The MathWorks of 3 Apple Hill Drive, Natick, Mass. 01760-2098, Phone: 508-647-7000 Fax: 508-647-7001, although other programs may be used depending upon the embodiment. The present invention has been coded using the following computer codes to provide the better or worse index and reliability comparability according to embodiments of the present invention. Of course, one of ordinary skill in the art would recognize other variations, modifications, and alternatives. The computer code, which is subject to copyright protection by the present assignee, has been reproduced as follows:

Copyright Notice: All Rights Reserved © 2004-2005 Semiconductor Manufacturing International Corporation

```
t1=[16;data1(:,2);1638]; % t1=[4;data1(:,2);4002] min=4
    should be <min data1(:,2)=5 & max=4002>maxdata1(:,
    2)=4001
y1=[0;data1(:,3);1];
t2=[260;data2(:,2);1580]; % in this theoretical case, t2 is
    exactly same as t1.
y2=[1;data2(:,3);0];
x1=linspace(17,1637,13); x2=linspace(262,1578,13);
mint10=min(t1);  minx1=min(x1);  mint1=min(mint10,
    minx1);
maxt10=max(t1); maxx1=max(x1); maxt1=max(maxt10,
    maxx1);
mint20=min(t2);  minx2=min(x2);  mint2=min(mint20,
    minx2);
maxt20=max(t2); maxx2=max(x2); maxt2=max(maxt20,
    maxx2);
mint=min(mint1,mint2); maxt=max(maxt1,maxt2);
logt1=log10(t1);   logt2=log10(t2);   logx1=log10(x1);
    logx2=log10(x2);
y1i=pchip(t1,y1,x1); pp1=pchip(x1,y1i); % pp1=pchip
    (x1,y1i);
F01=fn2fm(pp1,'B-'); % F1(t) with t1 or x1
f01=fnder(F01,1); % f1(t)
y2i=pchip(t2,y2,x2);
pp2=pchip(x2,y2i); % or pp2=pchip(x2,y2i);
R2=fn2fm(pp2,'B-'); % R2(t) with t2 or x2
r1=fncmb(f01,'*',R2);
mint=max(minx1,minx2); % mint=max(minx1,minx2) or
    mint=min([t1;t2])
maxt=min(maxx1,maxx2); % maxt=min(maxx1,maxx2)
    or
maxt=max([t1;t2])
R1=fnint(r1); P1=diff(fnval(R1,[mint,maxt]));
pp1i=pchip(x1,y1i); % or pp1i=pchip(x1,y1i);
F1=fn2fm(pp1i,'B-'); f1=fnder(F1,1);
f20=1-y2; f2i=pchip(t2,f20,x2);
pp2i=pchip(x2,f2i); % pp2i=pchip(x2,f2i);
F2=fn2fm(pp2i,'B-'); % F2(t)
f2=fnder(F2,1); % f2(t)
T1=703; T2=703;
I1=fnint(f1); I2=fnint(f2);
R10=1-y1; R10i=1-y1i; % y1i=pchip(t1,y1,x1);
X1=linspace(17,1637,80); X2=linspace(262,1578,80);
X1i=linspace(17,1637,20); X2i=linspace(262,1578,20);
f1val=fnval(f1,X1); f1ival=fnval(f1,X1i); f2val=fnval(f2,
    X2);
f2ival=fnval(f2,X2i);
f1ipchip=pchip(X1,f1val,X1i); pp3=pchip(X1i,f1ival); %
    or
pp3=pchip(X1,f1val); or pp3=pchip(X1i,f1ival);
u1=fn2fm(pp3,'B-'); % f1(t) with X1 or X1i
f2ipchip=pchip(X2,f2val,X2i); pp4=pchip(X2i,f2ival); %
    or
pp4=pchip(X2,f2val); or pp4=pchip(X2i,f2ival);
u2=fn2fm(pp4,'B-'); % f2(t) with X2 or X2i
F20=fnint(f2); F20val=fnval(F20,X2); F20ival=pchip(X2,
    F20val,X2i);
R20val=1-F20val; R20ival=1-F20ival;
pp5=pchip(X2i,R20ival); R22=fn2fm(pp5,'B-');
r2=fncmb(u1,'*',R22); IR2=fnint(r2);
minX1i=min(X1i);   minX2i=min(X2i);   maxX1i=max
    (X1i); maxX2i=max(X2i);
minX=max(minX1i,minX2i);      maxX=min(maxX1i,
    maxX2i);
P2=diff(fnval(IR2,[minX,maxX]));
BOW2=(0.5-P2)/0.5
I1=fnint(u1); I2=fnint(u2);
minX1=min(X1);  minX2=min(X2);  maxX1=max(X1);
    maxX2=max(X2);
P21=diff(fnval(II2,[minX2i,T1])),     P23=diff(fnval(II1,
    [T2,maxX1i])), %
P22=diff(fnval(II1,[T1,T2]))
RC2=P21+P23% RC2=P21+P22+P23
subplot(2,2,1)
R22i=fnval(R22,X2i); fu1i=fnval(u1,X1i);
plot(t2,y2,X2i,R22i)% Raw Data Plot plot(logt1,R10,
    logt2,y2)
plot(X1i,fu1i,X2i,R22i)
subplot(2,2,2)
FNPLT(f1)
hold on
fnplt(f2)
hold off % f1(t) and f2(t) plot
subplot(2,2,3)
plot(logx1,R10i,logx2,y2i)% interpolated R1(t) & R2(t)
    with x1 & x2
subplot(2,2,4)
plot(X1i,f1ival,X2i,f2ival)% interpolated f1(t) & f2(t) with
    X1i & X2i
```

The disclosures and the description herein are purely illustrative and are not to be limited with the above examples. A person skilled in reliability engineering and reliability statistics would be able to apply the method disclosed in the above embodiments to his/her particular product, component or system in reliability testing. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for manufacturing integrated circuit devices, the method comprising:
   providing a first group, the first group being characterized by at least a first design and a first set of processes;
   providing a second group, the second group being characterized by at least a second design and a second set of processes;
   identifying at least a first reliability characteristic associated with the first group and identifying at least a second reliability characteristic associated with the second group;
   determining a first reliability function $R_1(t)$ of the first group, the first reliability function being associated with a time variable and the first reliability characteristic;
   determining second reliability function $R_2(t)$ of the second group, the second reliability function being associated with the time variable and the second reliability characteristic;
   determining a failure probability density function associated with the first reliability function and the second reliability function;

using a computer, calculating a failure probability f(t) for the first group and the second group from the failure probability density function from an initial time period to an infinite time period;

normalizing the failure probability for the first group and the second group; determining an index value using at least the normalized failure probability of the first group and the second group;

determining the first reliability characteristic of the first group using at least the index associated with the failure probability of the first group and the second group; and determining the second reliability characteristic of the second group using at least the index associated with the failure probability of the first group and the second group.

2. The method of claim 1 wherein determining the failure probability density function is associated with a difference between the first reliability density function and the second reliability density function.

3. The method of claim 1 wherein the index is characterized as a better or worse index (BOW).

4. The method of claim 1 wherein the index comprises a BOW index characterized in a value ranging from −1 to 1.

5. The method of claim 1 wherein the index is a BOW index ranging in value from −1 to 1.

6. The method of claim 1 wherein the index is a BOW index defined by the following relationship:

$$BOW \equiv \frac{\int_0^\infty f_2[R_1(t) - R_2(t)]dt}{\int_0^\infty f_2(t)R_2(t)dt},$$

which ranges from −1 to +1.

7. The method of claim 1 further comprising determining a reliability comparability associated with the first group and the second group.

8. The method of claim 1 further comprising determining a reliability comparability associated with the first group and the second group, the reliability comparability (RC) being defined by a relationship consisting of $$(RC) = \int_0^{t_1} f_2(t)dt + \int_{t_1}^\infty f_1(t)dt$$

where $t_1$ is an intersecting point of lifetime between a probability distribution function of $f_1(t)$ and a probability distribution function of $f_2(t)$.

9. The method of claim 8 wherein the reliability comparability is associated with a difference in the probability distribution function of $f_1(t)$ and the probability distribution function of $f_2(t)$.

10. The method of claim 1 wherein the first group comprises a first product and the second group comprises a second product.

11. The method of claim 1 wherein the first group being associated with a first MTTF and the second group being associated with a second MTTF, the first MTTF and the second MTTF being a substantially similar quantitative value.

12. The method of claim 1 wherein the first design is different from the second design or the first design is the same as the second design.

13. The method of claim 1 wherein the first processes are different from the second processes or the first processes are the same as the second processes.

14. The method of claim 1 wherein the first reliability characteristic and the second reliability characteristic are associated with a hot carrier injection feature.

15. The method of claim 1 wherein the first reliability characteristic and the second reliability characteristic are associated with at least one feature selected from a hot carrier injection feature, threshold voltage shift feature, a gate oxide integrity feature, an electro-migration feature, a high temperature operation life feature, and an early failure rate feature.

16. The method of claim 1 wherein the first reliability characteristic and the second reliability characteristic are defined as random variables.

17. The method of claim 1 further comprising determining a reliability comparability associated with the first group and the second group and outputting a color coded visual feature associated with the reliability comparability, the color coded visual feature being associated with a degree of fit between the probability distribution function of $f_1(t)$ and the probability distribution function of $f_2(t)$.

18. A method for manufacturing more than two products, the method comprising:

providing a first group, the first group being characterized by at least a first design and a first set of processes;

providing a second group, the second group being characterized by at least a second design and a second set of processes;

identifying at least a first reliability characteristic associated with the first group and identifying at least a second reliability characteristic associated with the second group;

determining a first reliability function R1(t) of the first group, the first reliability function being associated with a time variable and the first reliability characteristic;

determining second reliability function R2(t) of the second group, the second reliability function being associated with the time variable and the second reliability characteristic;

determining a failure probability density function associated with the first reliability function and the second reliability function;

using a computer, calculating a failure probability f(t) for the first group and the second group from the failure probability density function from an initial time period to an infinite time period;

determining the first reliability characteristic of the first group using at least the failure probability of the first group and the second group; and determining the second reliability characteristic of the second group using at least the index associated with the failure probability of the first group and the second group.

19. A computer based system for manufacturing more than two products, the system comprising:

one or more memories configured to be readable by a computer, the one or more memories including one or more computer codes stored on the one or more memories, the one or more computer codes being configured to be executable by the computer system, the one or more computer codes including:

one or more codes directed to receiving a first group of electronic information, the first group of electronic information being characterized by at least a first design and a first set of processes;

one or more codes directed to receiving a second group of electronic information, the second group of electronic information being characterized by at least a first design and a first set of processes;

one or more codes directed to identifying at least a first reliability characteristic associated with the first group and identifying at least a second reliability characteristic associated with the second group;

one or more codes directed to determining a first reliability function R1(t) of the first group, the first reliability density function being associated with a time variable and the first reliability characteristic;

one or more codes directed to determining second reliability function R2(t) of the second group, the second reliability density function being associated with the time variable and the second reliability characteristic;

one or more codes directed to determining a failure probability density function associated with the first reliability function and the second reliability function;

one or more codes directed to calculating a failure probability f(t) for the first group and the second group from the failure probability density function from an initial time period to an infinite time period;

one or more codes directed to determining the first reliability characteristic of the first group using at least the failure probability of the first group and the second group; and one or more codes directed to determining the second reliability characteristic of the second group using at least the index associated with the failure probability of the first group and the second group.

20. The system of claim 19 wherein one or more codes in the one or more memories is executable and the one or more memories are configured to be readable by the computer system.

* * * * *

UNITED STATES PATENT AND TRADEMARK OFFICE
CERTIFICATE OF CORRECTION

PATENT NO. : 7,660,699 B2 Page 1 of 1
APPLICATION NO. : 11/200497
DATED : February 9, 2010
INVENTOR(S) : Chien et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1090 days.

Signed and Sealed this

Thirtieth Day of November, 2010

David J. Kappos
*Director of the United States Patent and Trademark Office*